US006221953B1

(12) United States Patent
Sandstrom et al.

(10) Patent No.: US 6,221,953 B1
(45) Date of Patent: Apr. 24, 2001

(54) TIRE WITH TREAD WHICH CONTAINS SPATIALLY-DEFINED RESINS

(75) Inventors: Paul Harry Sandstrom, Tallmadge; Thomas Joseph Segatta, Copley, both of OH (US); Johnny Dale Massie, II, Lexington, KY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/371,911

(22) Filed: Aug. 10, 1999

(51) Int. Cl.[7] .................................. C08L 37/00

(52) U.S. Cl. ........................ 524/518; 524/515; 524/528
(58) Field of Search ..................... 524/518, 495, 524/496, 515, 528

(56) References Cited

U.S. PATENT DOCUMENTS 3,927,144 * 12/1975 Hayashi et al. ...................... 260/888

* cited by examiner

*Primary Examiner*—Edward J. Cain
(74) *Attorney, Agent, or Firm*—Henry C Young, Jr.

(57) ABSTRACT

A pneumatic tire with a rubber tread which contains at least three resins with spatially-defined softening point ranges.

76 Claims, No Drawings

TIRE WITH TREAD WHICH CONTAINS SPATIALLY-DEFINED RESINS

FIELD

This invention relates to a pneumatic tire with a rubber tread which contains at least three resins with spatially-defined softening point ranges.

BACKGROUND

Pneumatic rubber tires are composed of elements which conventionally include a tread of a rubber composition. The tread rubber is often desirably compounded (blended or mixed with compounding ingredients) to provide a tire with a relatively low rolling resistance and a tread with reasonable wear and traction.

However, where tires are intended to be used for purposes where traction (skid resistance) is a primary consideration such as, for example, may be desired for high performance tires, the tread rubber may be compounded to enhance traction where a possibility of reduced treadwear and increased tire rolling resistance may be considered to be of somewhat lesser importance.

For such purpose of emphasizing tread rubber traction, the tread may be compounded to have a relatively high ratio of resin and processing oils to rubber (e.g. a range of about 15 to about 40 weight percent in the rubber composition) which may be more conventionally expressed in terms of 100 parts by weight rubber (phr) as being, for example, in a range of about 45 to about 120 phr.

The resin may typically have a softening point (Ring and Ball) in a range of about 20° C. to about 110° C.

The purpose of the resin, among other purposes, is to enhance traction of the tread. While the tread rubber may normally contain such a resin, in instances where tread traction itself is to be emphasized or enhanced, the resin content in the tread rubber may be increased to the aforesaid amount.

While the traction enhancing feature(s) of the resin may be due to various factors, the softening point of the resin is normally considered important because, as the resin softens, it undergoes a phase transition and its mechanical properties change.

Indeed, it is usually considered that the resin in the rubber compound acts to soften the rubber compound and increase its hysteresis at a rubber temperature equivalent to or immediately above the resin's softening point.

Such softening point property of the resin is desirably taken advantage of in practice where, for example, as the tire is run from a stationary, resting position to vehicle driving speeds, the temperature of the tread may increase from its stationary ambient temperature (e.g. 23° C.) to a temperature of 100° C. or even higher at high vehicular speeds (>80 mph).

Thus, in such a circumstance, a resin with a softening point of about 30° C. would be expected to soften and become very hysteretic at a tread temperature of about 20° C. to about 50° C. and, thus, aid in tire traction at such tread temperatures. Thereafter, as the tread temperature increases to 100° C., for example, the resin would be expected to be in a softened or perhaps liquid state and the tread traction would, accordingly, be expected to be affected only to a very limited degree by the aforesaid 30° C. softening point resin as the rubber temperature increased and moved further above 30° C.

A considerably higher softening point resin would be desirable to enhance tread traction at the higher tread temperature associated with the higher vehicular speed.

It is suggested herein that as the resin softens, the cured rubber compound containing the resin becomes hysteretic. This means the rubber compound transfers the energy generated in the tread as it rolls into heat, which in turn results in improved traction performance.

It is recognized that various resins are typically used in formulating a tire tread for various purposes, and resins are heretofore often used in somewhat larger amounts in tire treads, particularly where tread traction on the road is a primary or large consideration.

Representative examples of such resins which, as it is understood, are or may be used to aid in tire tread traction are hydrocarbon-derived synthetic resins, coumarone-indene resins, rosin, rosin derivatives and dicyclopentadiene based resins such as, for example, dicyclopentadiene/diene resins.

Such resins may typically have softening points (Ring and Ball) within the aforesaid range of about 20° C. to about 110° C. and even up to about 170° C.

However, few if any, of such resins are normally used in rubber tire treads which have a softening point higher than about 110° C.

In practice, it is desired to take advantage of the described softening point property of the resin(s) to formulate a tire tread in a manner designed to enhance the tread traction over a relatively wide range of tire tread temperatures.

In another aspect of tire tread rubber considerations, it should be pointed out that viscoelastic properties of a rubber, or a rubber blend, for tire tread applications, are important. For example, a tangent delta viscoelastic property is the ratio of the viscous contribution to the elastic contribution for a viscoelastic rubber article subjected to a cyclic deformation. The term "tangent delta" is often referred to herein as "tan. delta". Its characterization of viscoelastic properties of rubber is well known to those skilled in such art. Such property is typically represented in the form of a curve as a temperature sweep plot of tangent delta values on a y, or vertical, axis versus temperature on an x, or horizontal, axis.

Although various rubber compositions are taught to provide various benefits, some for tire treads, it is desired to provide a pneumatic tire having a rubber tread having enhanced traction qualities over a relatively wide temperature range and, thus, a tan. delta characteristic which maintains a high tan. delta as the temperature increases.

In the description of this invention, rubber compound, sulfur-cured rubber compound, rubber composition, rubber blend and compounded rubber are used somewhat interchangeable to refer to rubber which has been mixed with rubber compounding ingredients. Such terms are well known to those having skill in such art.

DISCLOSURE AND PRACTICE OF INVENTION

In accordance with this invention, a pneumatic tire is provided having an outer circumferential tread where said tread is a sulfur-cured rubber composition characterized by containing, based on 100 parts by weight rubber (phr), about 6 to about 30 parts by weight of at least three, and preferably at least four, resins, including three basic resins, each resin being present in an amount of at least about 2 parts by weight and characterized by having softening points (Ring and Ball) in a range of about 20° C. to about 170° C., preferably about 30° C. to about 150° C.; wherein the basic three of said resins have spatially-defined softening point ranges in which a first of said basic three resins has a softening point in a range of about 20° C. to about 110° C., preferably about 25°

C. to about 105° C., a second of said basic three resins has a softening point at least 30° C. higher than that of said first basic resin and in a range of about 70° C. to about 140° C., and preferably about 80° C. to about 140° C.; wherein a third of such basic three resins has a softening point at least 30° C. higher than that of said second basic resin and in a range of about 100° C. to about 170° C. preferably about 100° C. to about 150° C.; wherein said first and/or second resin of said three basic resins is selected from at least one specified resin selected from (a) coumarone-indene resin(s), (b) alkylated hydrocarbon resin(s), (c) aromatic petroleum hydrocarbon resin(s), and (d) dicyclopentadiene/diene resin(s); and wherein the remaining resin or resins, as the case may be, of said basic three resins, is selected from at least one of the remaining, unselected, said specified resins.

Thus, in the practice of this invention, said basic three resins are required to consist of not more than two resins of similar chemical structure.

Any of said fourth or more additional resin(s) has a softening point in the range of about 20° C. to about 170° C., without any other softening point limitation and, thus, is not required to have a softening point of at least 30° C. difference from said other resins. Such additional resin(s) is(are) preferably present in an amount in a range of about 4 to about 12 phr.

The term "phr" is an abbreviation for "parts (of an indicated material) by weight per 100 parts by weight rubber".

In one aspect, the sulfur-cured rubber compound for this invention which contains the aforesaid resins with spatially-defined softening points is further characterized by having a viscoelastic response demonstrated by an equal or higher E' (elastic modulus) and, also, by a higher tan. delta value (at comparable temperatures over a temperature range of about 300 to about 150° C.) than a comparative sulfur-cured rubber compound, referred to herein as a "Control" rubber compound, which may further be referred to as "Control rubber CR" or as "CR", according to a temperature sweep test for such purpose. For this description, the temperature sweep test is conducted with an Autovibron® instrument. Such viscoelastic response is particularly evident when compared to a corresponding response for the Control rubber compound which contains or is composed of ingredients shown in Table 1 herein.

Such qualifying and comparative test is a comparative viscoelastic test, referred to herein as a "Standard Test", which may be further referenced to herein as "Standard Test ST" or "ST", and utilizes a defined control rubber, (the Control rubber composition), for comparison.

The Standard Test is a measure for qualifying the resins, particularly the basic three resins, for use in rubber compositions according to this invention. Thus, in one aspect, the resins, particularly the basic three resins, in order to qualify, must collectively "pass the Standard Test".

In the practice of this invention, it is an important aspect that at least three, and preferably at least four resins, are used in order to aid in providing tire tread traction over a wide range of temperatures.

While the three basic required resins as a whole are required to have softening points in a range of about 20° C. to about 170° C., it is required that the basic three resins have the described spatial softening points and that the fourth or more additional resin(s), if used, is (are) to simply have a softening point in the aforesaid overall temperature range without the spatial requirement.

The aforesaid three or more resins, including said basic three resins, as broadly contemplated by this invention, may be individual compositions that differ from each other or may be similar in composition.

The amount of each prescribed resin, in practice, is at least two phr, and there is at least six phr of total resin in the formulation in order that the resins may reasonably affect the aforesaid tan. delta viscoelastic property in a 30° C. to 150° C. temperature range and to contribute to the tread traction.

By tread traction it is meant handling, grip and cornering performance of the tire and particularly the tire's resistance to skidding on a road surface.

It is important for this invention that a first basic resin has a softening point in a range of about 20° C. to about 110° C., more preferably about 25° C. to about 105° C., in order to contribute to tread traction in the 20° C. to about 110° C. range.

It is also important for this invention that a second basic resin has a softening point in a range of about 70° C. to about 140° C., preferably about 80° C. to about 140° C., and has a softening point of at least 30° C. higher than that of said first resin to contribute to tread traction in the 70° C. to 140° C. temperature range and to aid in maintaining rubber stiffness at lower temperatures.

It is further important for this invention that the third basic resin has a softening point in a range of about 100° C. to about 170° C., preferably about 100° C. to about 150° C., and at least 30° C. higher therefrom to contribute to tread traction at a temperature range of about 100° C. to about 170° C. (or 15° C.).

Any additional resin(s) preferably has (have) a softening point in a range between about 20° C. and 170° C., more preferably about 30° C. to about 150° C., without any other temperature limitation.

The term "softening point", as hereinbefore observed, refers to Ring and Ball softening point as determined by ASTM No. E28.

It has been indicated that the tan. delta and elastic modulus (E') viscoelastic properties of the cured tread rubber are also an important aspect of this invention.

Indeed, such properties are to be considered as a selection criteria for the resins contemplated for use in this invention, in addition to their spatial softening point bracketed range requirements.

The aforesaid Standard Test (ST) with the Control rubber composition (CR) is used for the evaluation and qualifying purposes.

These properties are measured as a function of increasing temperature during the viscoelastic property test (the Standard Test). During the test, a curve, or data from which a curve is generated, is obtained which reflects tan. delta and E' (on the y axis) versus increasing temperature (on the x axis).

It is required, for the rubber/resin mixture for this invention, that the tan. delta and elastic modulus (E') versus increasing temperature curve demonstrate an optimization in the 30° C. to 150° C. temperature range. This, in effect, is considered a test parameter for the resins to be used for this invention. By optimization it is meant that the tangent delta is higher than the Control and that the elastic modulus (E') is greater than or equal to the Control at comparable temperatures within the 30° C. to 150° C. temperature range.

In the practice of this invention, the following representative resins are contemplated for use so long as they have the required softening point parameters (spatial temperature ranges) and so long as they also satisfy the aforesaid Standard Test (ST) (E' and tan. delta) requirements.

Representative examples of such contemplated resins are petroleum hydrocarbon resins, coumaroneindene resins, alkylated petroleum hydrocarbon resins, aromatic hydrocarbon resins, dicyclopentadiene/diene resins, and rosin and rosin derivatives.

Preferred contemplated resins are of the coumarone-indene type, dicyclopentadiene/diene type, and aromatic petroleum resins.

For example, for a coumarone-indene resin in a softening point range of about 20° C. to 40° C., a resin such as Cumar R-29 from Neville Chemical Co. is contemplated. Coumarone-indene resins are a class of resins recognized by those having skill in such resin art. They are typically derived from the polymerization of coumarone and indene.

For example, for an alkylated petroleum hydrocarbon resin in about a 120° C. to 150° C. softening point range, primarily saturated alkylated resins are contemplated such as, for example, Nevchem 150 by Neville Chemical Co. Such resins might be prepared, for example, by the alkylation of aromatic hydrocarbons with dicyclopentadiene (see U.S. Pat. No. 3,023,200).

For example, for an aromatic petroleum hydrocarbon resin in an intermediate softening point range of about 90° C. to about 110° C. a resin such as LX-782 by Neville is contemplated. In one aspect, such resins contain carbon-to-carbon unsaturation (double bonds) and may conventionally be a mixture of aromatic and acyclic polymer moieties, although they may be referred to as 'aromatic petroleum resins". The aromatic component of the resin is preferably selected from styrene, alpha-methylstyrene or t-butyl styrene and the remaining component of the resin is an aliphatic hydrocarbon. Such class of resins are believed to be recognized as such by those having a skill in such resin art.

In one aspect of the invention, a dicyclopentadiene/diene resin composition is contemplated as the reaction product of the polymerization reaction between dicyclopentadiene and at least one olefin hydrocarbon (a diene) copolymerizable therewith which has 4 to 12 carbon atoms and which is selected from monoolefins and diolefins. While various diolefins are contemplated, including limonene and cyclooctadiene, cyclooctadiene is preferred. Preferably, such dicyclopentadiene-olefin copolymer is comprised of about 50 to about 80 weight percent dicyclopentadiene. Such resin is contemplated which has a softening point in a range of about 20° C. to about 170° C. or even up to about 220° C. Thus, on a preferable basis, for example, a dicyclopentadiene/cyclooctadiene copolymer resin composed of about 50 to about 80 weight dicyclopentadiene is contemplated.

Representative of such various dicyclopentadiene/diene resins are shown in U.S. Pat. No. 3,927,144 and, for such disclosure, is hereby incorporated herein by reference.

It is to be appreciated that, in one aspect, conventionally, varying softening point versions of the same basic resin may be used for two of the required basic three resins so long as the softening points of the individual basic three resins fall within the required softening point ranges.

Alternatively, at least two of said basic three resins may be of different resin types or versions.

For example, one or two of the said basic resins may be a dicyclopentadiene/diene resin and the remaining one or two of the basic three resins may be a coumarone-indene type resin or may be selected from at least one of coumarone-indene type and aromatic petroleum resins.

As a further example, said basic resins may be comprised of at least one dicyclopentadiene/diene resin as a copolymer of dicyclopentadiene and cyclooctadiene or limonene, preferably cyclooctadiene, and at least one coumarone-indene resin.

Alternatively, one or two of the said basic resins may be a coumarone-indene type and the remaining one or two of the basic three resins may be selected from at least one of dicyclopentadiene/diene type and aromatic petroleum resins.

Alternatively, one or two of the said basis resins may be an aromatic petroleum resin and the remaining one or two of the basic three resins may be selected from at least one of dicyclopentadiene/diene type and coumarone-indene type resins.

In the compounding of the tire tread, various rubbers may be used which are, preferably, relatively high unsaturation diene-based rubbers. Representative examples of such rubbers are, although they may not be so limited, are: styrene-butadiene rubber, natural rubber, cis 1,4- and 3,4-polyisoprene rubbers, cis 1,4- and vinyl 1,2-polybutadiene rubbers, acrylonitrile-butadiene rubber, styrene-isoprene-butadiene rubber and styrene-isoprene rubber.

While the contribution of various elements or components of a rubber composition may not always be completely understood, it is contemplated that an important and significant component of the rubber blend is the resins with their defined, spatial softening point ranges which apparently also provide desirable viscoelastic properties as evidenced by the aforesaid tan. delta values.

Comparative Viscoelastic Test (The "Standard Test")

As a screening test for the resins suitable for this invention, insofar as viscoelastic properties are concerned, a rubber recipe is provided according to the following Table 1. Table 1 sets forth a Test Control recipe, or "Control", recipe and a comparative recipe with Exp. as a prefix.

TABLE 1

| Component | (Test Control) Parts by Weight Control | Parts by Weight Exp. |
| --- | --- | --- |
| A. First Batch | | |
| SBR rubber[1] | 137.5 | 137.5 |
| Carbon black, SAF[2] | 130.0 | 130.0 |
| Processing oil, aromatic[3] | 30.0 | 22.0 |
| Processing oil, paraffinic[4] | 30.0 | 22.0 |
| Soybean oil[10] | 30.0 | 22.0 |
| Stearic acid | 5.0 | 5.0 |
| Zinc oxide | 5.0 | 5.0 |
| Antioxidant[5] | 2.0 | 2.0 |
| Resins A, B, C[6] | | 24.0 |
| B. Second Batch | | |
| Accelerator No. 1[7] | 3.0 | 3.0 |
| Accelerator No. 2[8] | 1.5 | 1.5 |
| Sulfur[9] | 1.0 | 1.0 |

[1]Emulsion polymerization prepared styrene/butadiene rubber containing about 40% styrene as 72.73 weight percent SBR (100 parts SBR) and 27.27 weight percent aromatic oil.
[2]SAF, N100 type carbon black obtainable from the Cabot company.
[3]An aromatic rubber processing oil obtainable from the Mobil company.
[4]A paraffinic rubber processing oil obtainable from the Shell company.
[5]A 1,2-dihydro-2,2,4-trimethylquinoline.
[6]Resins contemplated for use in this invention having softening points within a range of about 20° C. to about 170° C.
[7]A benzothiazyl disulfide obtainable as Thiofide from the Monsanto company.
[8]Tetramethyl thiuram disulfide (TMTD).
[9]Rubber Maker's sulfur from the Struktol company.
[10]Soybean oil obtainable as Sterling Oil from the Proctor & Gamble company.

The blend is prepared by first mixing the First Batch A ingredients in a rubber mixer (first mixing stage) and then mixing the Second Batch B therewith (second mixing stage).

The mixture is then shaped and cured into sheets having a thickness of about one-tenth inch.

Samples of cured rubber blends were tested by an Autovibron® automated dynamic viscoelastic tester, an instrument provided by Imass, Inc., of which Model AVD985 is used herein, to determine, or measure, the relationship of tan. delta versus increasing the temperature from 20° C. to 150° C. for the indicated rubber blend containing the resin being tested. A dynamic strain amplitude of 0.5% (on top of a 5% static strain) and frequency of 11 Hertz were used.

The objective for this test is to measure the viscoelastic response to an applied deformation of a cured rubber sample under tension at a specified strain, frequency and temperature, or temperature range. The viscoelastic response is used by the instrument to determine the elastic modulus, E', and viscous modulus, E". The ratio of E"/E' is the tan. delta for a particular temperature.

Thus, in effect, the tan. delta is a measure of a compound's viscoelastic character and has been observed to relate to tire tread performance. The tan. delta versus temperature characterization of rubbers is well known to those having skill in such art.

In this description, such test for the rubber composition, taken with the prescribed rubber recipe of Table 1 is the comparative viscoelastic test referred to herein as the "Standard Test".

As pointed out, in practice it has been observed that, for pneumatic rubber tires, a relatively high, or optimized, tan. delta in the region of 30° C. to 150° C. is desirable for a tire tread to provide a tire with excellent handling.

The tan. delta versus temperature curve for the experimental tread rubber compound containing the spatially-defined resin blend has been observed to exhibit a higher tan. delta, compared to the control, in the region of 30° C. to 150° C., thus, predictably suitable for providing excellent tire tread traction. Thus, the Standard Test for qualifying the resin blend is considered an important aspect of the invention.

It should readily be understood by one having skill in the art that said tread portion of the pneumatic tire, as well as the rubber or other material in the basic carcass, which normally contains reinforcing elements in the tread region, can be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins, silicas, and plasticizers, fillers, pigments, stearic acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized materials (rubbers), the certain additives mentioned above are selected and commonly used in conventional amounts.

Such pneumatic tires are conventionally comprised of a generally toroidal-shaped carcass with an outer circumferential tread, adapted to be ground contacting, spaced beads and sidewalls extending radially from and connecting said tread to said beads.

For high performance applications, typical additions of carbon black comprise about 60 to about 140 parts by weight of diene rubber (phr), preferably 70 to 100 phr. Typical amounts of tackifier resins, if used, comprise about 0.5 to 10 phr. Typical amounts of processing aids comprise 40 to 140 phr. Typical amounts of silica, if used, comprise about 10 to about 20 phr and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur-containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in *The Vanderbilt Rubber Handbook* (1978), pages 344–346. Suitable antiozonant(s) and waxes, particularly microcrystalline waxes, may be of the type shown in *The Vanderbilt Rubber Handbook* (1978), pages 346–347. Typical amounts of antiozonants comprise 1 to about 5 phr. Typical amounts of stearic acid comprise 1 to about 3 phr. Typical amounts of zinc oxide comprise 2 to about 5 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur-vulcanizable compositions.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators in which a primary accelerator is generally used in the larger amount (0.5 to 1.0 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in the art.

In the practice of this invention, the tread rubber containing the resin blend can be integral with and adhered to various tire carcass substrate rubber compositions. Typically, such a rubber composition is at least one of a styrene-butadiene copolymer rubber, cis 1,4-polyisoprene (natural or synthetic) rubber, 3,4-polyisoprene rubber, 1,4-polybutadiene rubber, styrene-butadiene-isoprene rubber and styrene-isoprene rubber. Optionally, such a blend for a portion of the tread, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubbers.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Rubber compositions were prepared for evaluating various resins for use in the invention. For each of the rubber compositions, three or four resins were used with appropriate softening points according to the following recipe of Table 2, and which was described more fully according to Table 1, and represented herein as Exp. 1–Exp. 4 with the Test Control composition represented as Exp. 1:

TABLE 2

| Mixing Stage | Material | Exp 1 (Contl) | Exp 2 | Exp 3 | Exp 4 |
|---|---|---|---|---|---|
| | | Parts | | | |
| 1 | Coumarone-Indene Resin Blend[1] | 0 | 24.0 | 0 | 0 |
| 1 | Alkylated Hydrocarbon Resin Blend[2] | 0 | 0 | 24.0 | 0 |
| 1 | Petroleum Resin[3] Blend | 0 | 0 | 0 | 24.0 |
| | Total | 375.0 | 375.0 | 375.0 | 375.0 |

[1]Coumarone-Indene resin blend of equal amounts of four resins, 25% each with softening points of 28, 58, 112 and 126° C., respectively obtained as Cumar R-29, Cumar R-1, Cumar LX-509, and Cumar R-19 resins respectively from the Neville company.
[2]Alkylated hydrocarbon resin blend of equal amounts of three resins with softening points of 70, 120 and 150° C., respectively and obtained as Nevchem 70, Nevchem 120 and Nevchem 150 resins respectively from the Neville company.
[3]Petroleum resin blend of equal amounts of three resins with softening points of 102, 140 and 170° C. obtained as LX-782, LX-1082, 280 and LX-1035 resins, respectively from the Neville company.

EXAMPLE II

Rubber compositions were prepared according to Table 1 for evaluation of additional resin combinations for use in the invention. For each of the rubber compositions four resins were used with appropriate softening points, according to the following recipe of Table 3 and represented herein as Exp. 5–Exp. 8 with the control composition (Control) represented as Exp. 5, the composition of Exp. 6 follows the Control recipe outlined in Table 1 except for consisting of 20 phr of each of aromatic processing oil, paraffinic processing oil and soybean oil and Exp. 7 and Exp. 8 follow the Control recipe outlined in Table 1:

TABLE 3

| Mixing Stage | Material | Exp. 5 (Contl) | Exp. 6 | Exp. 7 | Exp. 8 |
|---|---|---|---|---|---|
| | | Parts | | | |
| 1 | Resin Blend[1] | 0 | 24 | 0 | 0 |
| 1 | Resin Blend[2] | 0 | 0 | 24 | 0 |
| 1 | Resin Blend[3] | 0 | 0 | 0 | 24 |
| | Total Parts | 375.0 | 375.0 | 375.0 | 375.0 |

[1]Mixture of dicyclopentadiene/cyclooctadiene resins, in equal amounts, with a dicyclopentadiene/cyclooctadiene ratio of approximately 2:1 and with softening points of 25, 60, 110 and 150° C., respectively; prepared by The Goodyear Tire & Rubber Company.
[2]Mixture of dicyclopentadiene/limonene resins, in equal amounts, a dicyclopentadiene/limonene ratio of approximately 2:1 and with softening points of 60, 130, 160 and 170° C., respectively; prepared by The Goodyear Tire & Rubber Company.
[3]Mixture of dicyclopentadiene/dipentene resins, in equal amounts, with a dicyclopentadiene/dipentene ratio of approximately 2:1 and with softening points of 25, 70, 80 and 110° C., respectively; prepared by The Goodyear Tire & Rubber Company.

For the purposes of this Example, when there are four resins present, the lowest softening point resin is considered to be resin No. 1 and the highest softening point resin is considered to be the resin No. 3. Resin No. 2 is the resin which is at least 30° C. different from resin No. 1 and resin No. 3. The No. 4 is the remaining resin.

EXAMPLE III

The rubber compositions of Experiments Exp. 1–Exp. 4 of EXAMPLE I were cured and evaluated for properties as shown in Table 4.

TABLE 4

EXAMPLE IV

| Property | Exp. 1 (Contl) | Exp. 2 | Exp. 3 | Exp. 4 |
|---|---|---|---|---|
| MDR 2000 Rheometer at 150° C. | | | | |
| S' minimum[1] (dN-m) | 2.5 | 2.5 | 2.7 | 2.8 |
| S' maximum[1] (dN-m) | 10.8 | 10.9 | 11.3 | 10.6 |
| $T_{25}$ (min)[2] | 4.9 | 4.4 | 5.5 | 5.1 |
| $T_{90}$ (min)[2] | 15.3 | 16.4 | 18.9 | 22.0 |
| Stress-Strain, Cured Sample at 28 min./150° C. | | | | |
| 300% Modulus[3] (MPa) | 4.9 | 5.0 | 4.7 | 3.9 |
| Tensile[3] (MPa) | 9.9 | 9.1 | 9.6 | 9.2 |
| Elongation[3] (%) | 581 | 534 | 580 | 664 |
| Autovibron ® Tested Cured Sample 28 min./150° C. Test Run 11 Hz and 3° C./min. Heating Rate | | | | |
| E' @ 60° C.[4] (MPa) | 31 | 24 | 31 | 35 |
| Tan. delta[4] (60° C.) | 0.14 | 0.19 | 0.15 | 0.17 |
| E' @ 100° C.[4] (MPa) | 14 | 14 | 14 | 17 |
| Tan. delta[4] (100° C.) | 0.16 | 0.19 | 0.20 | 0.19 |
| E' @ 150° C.[4] (MPa) | 11 | 12 | 11 | 14 |
| Tan. delta[4] (150° C.) | 0.13 | 0.14 | 0.16 | 0.16 |

[1]The s' minimum and maximum values refer to in phase rheometer torque.
[2]The $T_{25}$ and the $T_{90}$ values refer to times to arrive at a 25 percent and a 90 percent cure, respectively. Such valuations are well known to those in the rubber compounding and curing art.
[3]The Modulus, Tensile and Elongation are conventional rubber property evaluations.
[4]The E' and Tan. Delta values were determined by the Standard Test.

EXAMPLE IV

The rubber compositions of Experiments Exp. 5–Exp. 8 were cured and evaluated for properties as shown in Table 5.

TABLE 5

| Property | Exp. 5 | Exp. 6 | Exp. 7 | Exp. 8 |
|---|---|---|---|---|
| MDR 2000 Rheometer at 150° C. | | | | |
| S' min. (dN-m) | 2.4 | 2.7 | 2.7 | 2.6 |
| S' max. (dN-m) | 9.8 | 9.4 | 10.0 | 7.5 |
| $T_{25}$ (min) | 5.2 | 5.5 | 5.8 | 5.8 |
| $T_{90}$ (min) | 16.0 | 19.5 | 26.0 | 24.0 |
| Stress-Strain, Cured Sample at 28 min/150° C. | | | | |
| 300% Modulus (MPa) | 4.6 | 2.9 | 3.2 | 2.6 |
| Tensile (MPa) | 9.0 | 7.0 | 7.9 | 8.1 |
| Elongation (%) | 580 | 688 | 684 | 773 |
| Autovibron ® Cured Sample 28 min./150° C. Test Run at 11 Hz and 3° C./min. | | | | |
| E' @ 60° C. (MPa) | 21 | 25 | 21 | 24 |
| Tan. delta (60° C.) | 0.16 | 0.19 | 0.19 | 0.19 |
| E' @ 100° C. (MPa) | 10 | 17 | 12 | 16 |
| Tan. delta (100° C.) | 0.16 | 0.19 | 0.19 | 0.19 |
| E' @ 150° C. (MPa) | 9 | 15 | 10 | 15 |
| Tan. delta (150° C.) | 0.13 | 0.17 | 0.17 | 0.16 |

As the comparative viscoelastic test (Standard Test) data in Tables 4 and 5 indicate, the resins evaluated in Experiments Exp. 3, Exp. 4, Exp. 6 and Exp. 7 and Exp. 8 all produce an elastic modulus E' equal or greater than their associated controls (Exp. 1 and Exp. 5) respectively with tangent delta values higher throughout the 60° C.–150° C. temperature range, thus, determining that the resins would be suitable by the Standard Test for use in the practice of this invention.

The coumarone-indene resin blend evaluated in Exp. 2 did not meet the criteria for the Standard Test, nor for the spatial softening point range requirements and, thus, would not be considered suitable for the purposes of this invention.

The resins in compounds Exp. 4 and Exp. 6 would be considered as representative of a best mode of practicing the invention, insofar as the resin selection is concerned, due primarily to their higher elastic modulus E' in the 60° C.–150° C. temperature range.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer circumferential tread where said tread is a sulfur-cured rubber composition containing, based on 100 parts by weight rubber (phr), about 6 to about 30 parts by weight of at least three resins, including three basic resins, each resin being present in an amount of at least about 2 parts by weight and characterized by having softening points (Ring and Ball) in a range of about 20° C. to about 170° C.; wherein said basic three resins have spatially-defined softening point ranges in which a first of said basic three resins has a softening point in a range of about 20° C. to about 110° C., a second of said basic three resins has a softening point at least 30° C. higher than that of said first basic resin in a range of about 70° C. to about 140° C., and a third of said three basic resins has a softening point of at least 30° C. higher than of said second basic resin and in a range of about 100° C. to about 170° C.; wherein said first and/or second resin of said three basic resins is selected from at least one specified resin selected from (a) coumarone-indene resin(s), (b) alkylated hydrocarbon resin(s), (c) aromatic petroleum hydrocarbon resin(s), and (d) dicyclopentadiene/diene resin(s); and wherein the remaining resin or resins, as the case may be, of said basic three resins, is selected from at least one of the remaining, unselected, said specified resins.

2. The tire of claim 1 where, in said tread rubber, said basic three resins consist essentially of at least one of coumarone-indene resin(s) and dicyclopendiene/diene resin(s).

3. The pneumatic tire of claim 1 where, in said tread rubber, said basic three resins are selected from at least one of aromatic petroleum hydrocarbon resin(s) and dicyclopentadiene/diene resin(s).

4. The pneumatic tire of claim 1 where said dicyclopentadiene/diene resin is a dicyclopentadiene/cyclooctadiene copolymer resin having a softening point within a range of about 20° C. to about 170° C. and is comprised of about 50 to about 80 weight percent dicyclopentadiene.

5. The tire of claim 2 wherein said pneumatic tire of claim 1 where, in said tread rubber, said aromatic petroleum resin is characterized by its aromatic component being selected from styrene, alpha-methylstyrene or t-butyl styrene so long as it has a softening point in a range of about 90° C. to about 110° C., and wherein said dicyclopentadiene/diene resin is a reaction product of dicyclopentadiene and at least one diene copolymerizable therewith selected from limonene and cyclooctadiene and contains from about 50 to about 80 weight percent dicyclopentadiene so long as the resin has a softening point in a range of about 20° C. to about 170° C.

6. The tire of claim 1 wherein from one to two of said basic three resins is a coumarone-indene resin and wherein the remainder of said three basic resins is selected from at least one of dicyclopentadiene/diene resin and aromatic hydrocarbon resin.

7. The tire of claim 1 wherein from one to two of said basic three resins is a dicyclopentadiene/diene resin and wherein the remainder of said three basic resins is selected from at least one of coumarone-indene resin and aromatic hydrocarbon resin.

8. The tire of claim 1 wherein from one to two of said basic three resins is an aromatic hydrocarbon resin and wherein the remainder of said three basic resins is selected from at least one of coumarone-indene resin and dicyclopentadiene/diene resin.

9. The tire of claim 2 wherein from one to two of said basic three resins is a coumarone-indene resin and wherein the remainder of said three basic resins is selected from at least one of dicyclopentadiene/diene resin and aromatic hydrocarbon resin.

10. The tire of claim 2 wherein from one to two of said basic three resins is a dicyclopentadiene/diene resin and wherein the remainder of said three basic resins is selected from at least one of coumarone-indene resin and aromatic hydrocarbon resin.

11. The tire of claim 2 wherein from one to two of said basic three resins is an aromatic hydrocarbon resin and wherein the remainder of said three basic resins is selected from at least one of coumarone-indene resin and dicyclopentadiene/diene resin.

12. The tire of claim 3 wherein from one to two of said basic three resins is a coumarone-indene resin and wherein the remainder of said three basic resins is selected from at least one of dicyclopentadiene/diene resin and aromatic hydrocarbon resin.

13. The tire of claim 3 wherein from one to two of said basic three resins is a dicyclopentadiene/diene resin and wherein the remainder of said three basic resins is selected from at least one of coumarone-indene resin and aromatic hydrocarbon resin.

14. The tire of claim 3 wherein from one to two of said basic three resins is an aromatic hydrocarbon resin and wherein the remainder of said three basic resins is selected from at least one of coumarone-indene resin and dicyclopentadiene/diene resin.

15. The tire of claim 4 wherein from one to two of said basic three resins is a coumarone-indene resin and wherein the remainder of said three basic resins is selected from at least one of dicyclopentadiene/diene resin and aromatic hydrocarbon resin.

16. The tire of claim 4 wherein from one to two of said basic three resins is a dicyclopentadiene/diene resin and wherein the remainder of said three basic resins is selected from at least one of coumarone-indene resin and aromatic hydrocarbon resin.

17. The tire of claim 4 wherein from one to two of said basic three resins is an aromatic hydrocarbon resin and wherein the remainder of said three basic resins is selected from at least one of coumarone-indene resin and dicyclopentadiene/diene resin.

18. The tire of claim 5 wherein from one to two of said basic three resins is a coumarone-indene resin and wherein the remainder of said three basic resins is selected from at least one of dicyclopentadiene/diene resin and aromatic hydrocarbon resin.

19. The tire of claim 5 wherein from one to two of said basic three resins is a dicyclopentadiene/diene resin and wherein the remainder of said three basic resins is selected from at least one of coumarone-indene resin and aromatic hydrocarbon resin.

20. The tire of claim 5 wherein from one to two of said basic three resins is an aromatic hydrocarbon resin and wherein the remainder of said three basic resins is selected from at least one of coumarone-indene resin and dicyclopentadiene/diene resin.

21. The pneumatic tire of claim 1 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

22. The pneumatic tire of claim 2 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

23. The pneumatic tire of claim 3 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

24. The pneumatic tire of claim 4 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

25. The pneumatic tire of claim 5 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

26. The pneumatic tire of claim 6 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

27. The pneumatic tire of claim 7 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

28. The pneumatic tire of claim 8 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

29. The pneumatic tire of claim 9 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

30. The pneumatic tire of claim 10 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

31. The pneumatic tire of claim 11 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

32. The pneumatic tire of claim 12 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

33. The pneumatic tire of claim 13 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

34. The pneumatic tire of claim 14 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

35. The pneumatic tire of claim 15 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

36. The pneumatic tire of claim 16 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

37. The pneumatic tire of claim 17 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

38. The pneumatic tire of claim 18 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

39. The pneumatic tire of claim 19 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

40. The pneumatic tire of claim 20 which contains at least one additional resin in an amount of about 4 to about 12 phr having a softening point in a range of about 20 to about 170° C., without any other softening point limitation, selected from at least one of coumarone-indene resin, alkylated hydrocarbon resin, aromatic petroleum hydrocarbon resin and dicyclopentadiene/diene resin.

41. The pneumatic tire of claim 1 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

42. The pneumatic tire of claim 2 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

43. The pneumatic tire of claim 3 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

44. The pneumatic tire of claim 4 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

45. The pneumatic tire of claim 5 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

46. The pneumatic tire of claim 6 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

47. The pneumatic tire of claim 7 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

48. The pneumatic tire of claim 8 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

49. The pneumatic tire of claim 9 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

50. The pneumatic tire of claim 10 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

51. The pneumatic tire of claim 11 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

52. The pneumatic tire of claim 12 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

53. The pneumatic tire of claim 13 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

54. The pneumatic tire of claim 14 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

55. The pneumatic tire of claim 15 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

56. The pneumatic tire of claim 16 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

57. The pneumatic tire of claim 17 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

58. The pneumatic tire of claim 18 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

59. The pneumatic tire of claim 19 wherein said sulfur-cured tread rubber has viscoelastic properties with an E' equal to or higher than a Control rubber CR at comparable temperatures and with a higher tangent delta than a Control rubber CR at comparable temperatures, by the Standard Test ST over a temperature range of about 30° C. to about 150° C.

60. The pneumatic tire of claim 20 wherein said sulfur-cured tread rubber has viscoelastic properties with an E' equal to or higher than a Control rubber CR at comparable temperatures and with higher tangent delta than a Control rubber CR at comparable temperatures, by the Standard Test ST over a temperature range of about 30° C. to about 150° C.

61. The tire of claim 1 wherein said dicyclopentadiene/diene resin is a copolymer of dicyclopentadiene and cyclooctadiene.

62. The tire of claim 2 wherein said dicyclopentadiene/diene resin is a copolymer of dicyclopentadiene and cyclooctadiene.

63. The tire of claim 3 wherein said dicyclopentadiene/diene resin is a copolymer of dicyclopentadiene and cyclooctadiene.

64. The tire of claim 4 wherein said dicyclopentadiene/diene resin is a copolymer of dicyclopentadiene and cyclooctadiene.

65. The tire of claim 5 wherein said dicyclopentadiene/diene resin is a copolymer of dicyclopentadiene and cyclooctadiene.

66. The tire of claim 6 wherein said dicyclopentadiene/diene resin is a copolymer of dicyclopentadiene and cyclooctadiene.

67. The tire of claim 7 wherein said dicyclopentadiene/diene resin is a copolymer of dicyclopentadiene and cyclooctadiene.

68. The tire of claim 8 wherein said dicyclopentadiene/diene resin is a copolymer of dicyclopentadiene and cyclooctadiene.

69. The tire of claim 1 wherein said basic three resins with spatially-defined softening points are comprised of at least one dicyclopentadiene/diene resin as a copolymer of dicyclopentadiene and cyclooctadiene and at least one coumarone-indene resin.

70. The tire of claim 2 wherein said basic three resins with spatially-defined softening points are comprised of at least one dicyclopentadiene/diene resin as a copolymer of dicyclopentadiene and cyclooctadiene and at least one coumarone-indene resin.

71. The tire of claim 3 wherein said basic three resins with spatially-defined softening points are comprised of at least one dicyclopentadiene/diene resin as a copolymer of dicyclopentadiene and cyclooctadiene and at least one coumarone-indene resin.

72. The tire of claim 4 wherein said basic three resins with spatially-defined softening points are comprised of at least one dicyclopentadiene/diene resin as a copolymer of dicyclopentadiene and cyclooctadiene and at least one coumarone-indene resin.

73. The tire of claim 1 wherein said basic three resins with spatially-defined softening points are comprised of at least one dicyclopentadiene/diene resin as a copolymer of dicyclopentadiene and limonene and at least one coumarone-indene resin.

74. The tire of claim 2 wherein said basic three resins with spatially-defined softening points are comprised of at least one dicyclopentadiene/diene resin as a copolymer of dicyclopentadiene and limonene and at least one coumarone-indene resin.

75. The tire of claim 3 wherein said basic three resins with spatially-defined softening points are comprised of at least one dicyclopentadiene/diene resin as a copolymer of dicyclopentadiene and limonene and at least one coumarone-indene resin.

76. The tire of claim 4 wherein said basic three resins with spatially-defined softening points are comprised of at least one dicyclopentadiene/diene resin as a copolymer of dicyclopentadiene and limonene and at least one coumarone-indene resin.

* * * * *